United States Patent
Patel et al.

(10) Patent No.: US 10,404,626 B1
(45) Date of Patent: Sep. 3, 2019

(54) METHOD FOR RESETTING A PACKET PROCESSING COMPONENT TO AN OPERATIONAL STATE

(71) Applicant: Juniper Networks, Inc., Sunnyvale, CA (US)

(72) Inventors: Nayan S. Patel, Bedford, MA (US); Eswaran Srinivasan, Fremont, CA (US); Alex Baban, San Jose, CA (US); Timothy L. Patrick, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/934,662

(22) Filed: Mar. 23, 2018

(51) Int. Cl.

| | | |
|---|---|---|
| H04L 12/413 | (2006.01) | |
| H04L 12/939 | (2013.01) | |
| H04L 12/46 | (2006.01) | |
| H04L 12/947 | (2013.01) | |
| H04L 12/931 | (2013.01) | |
| H04L 12/26 | (2006.01) | |

(52) U.S. Cl.
CPC ........ H04L 49/557 (2013.01); H04L 12/4641 (2013.01); H04L 49/25 (2013.01); H04L 49/555 (2013.01); H04L 49/65 (2013.01); H04L 43/0823 (2013.01)

(58) Field of Classification Search
USPC ....................................... 370/447, 335, 338
See application file for complete search history.

(56) References Cited

U.S. PATENT DOCUMENTS

| | | |
|---|---|---|
| 8,806,266 B1 | 8/2014 | Qu et al. |
| 2013/0042150 A1 | 2/2013 | McNeeney |

OTHER PUBLICATIONS

Cisco., "Continuous Operations and High Availability," Cisco White Paper, Jan. 25, 2008, 16 pages, XP055595877. Retrieved from the Internet: [URL:https://www.cisco.com/c/en/us/products/collateral/switches/nexus-7000-10-slot-switch/White_Paper_Con . . .].
Extended European Search Report for Application No. EP18215934.3, dated Jun. 26, 2019, 11 pages.

*Primary Examiner* — Phuongchau Ba Nguyen
(74) *Attorney, Agent, or Firm* — Harrity & Harrity, LLP

(57) ABSTRACT

A network device that includes a plurality of packet processing components may receive traffic associated with one or more services. The network device may store state information for each of the plurality of packet processing components, while the plurality of packet processing components are receiving the traffic. The state information may include state configuration information and/or internal storage information. The state information may be stored using a data structure that is internal to the network device and external to the packet processing component. The network device may detect an error that prevents the packet processing component from processing at least a portion of the traffic. The network device may execute, based on detecting the error that prevents the packet processing component from processing at least the portion of the traffic, a recovery procedure that uses the state information to reset the packet processing component to an operational state.

20 Claims, 7 Drawing Sheets

100 →

Error Detection Technique
• Scan packet processing components
• Detect error in particular packet processing component 125
Detect error Network Device Recovery Procedure
• Disable particular packet processing component
• Reset particular packet processing component
  • Use State information to:
    • Restore configuration values
    • Restore register values
    • Restore memory values
• Re-enable particular packet processing component 130
Reset particular packet processing component to an operational state Network Device

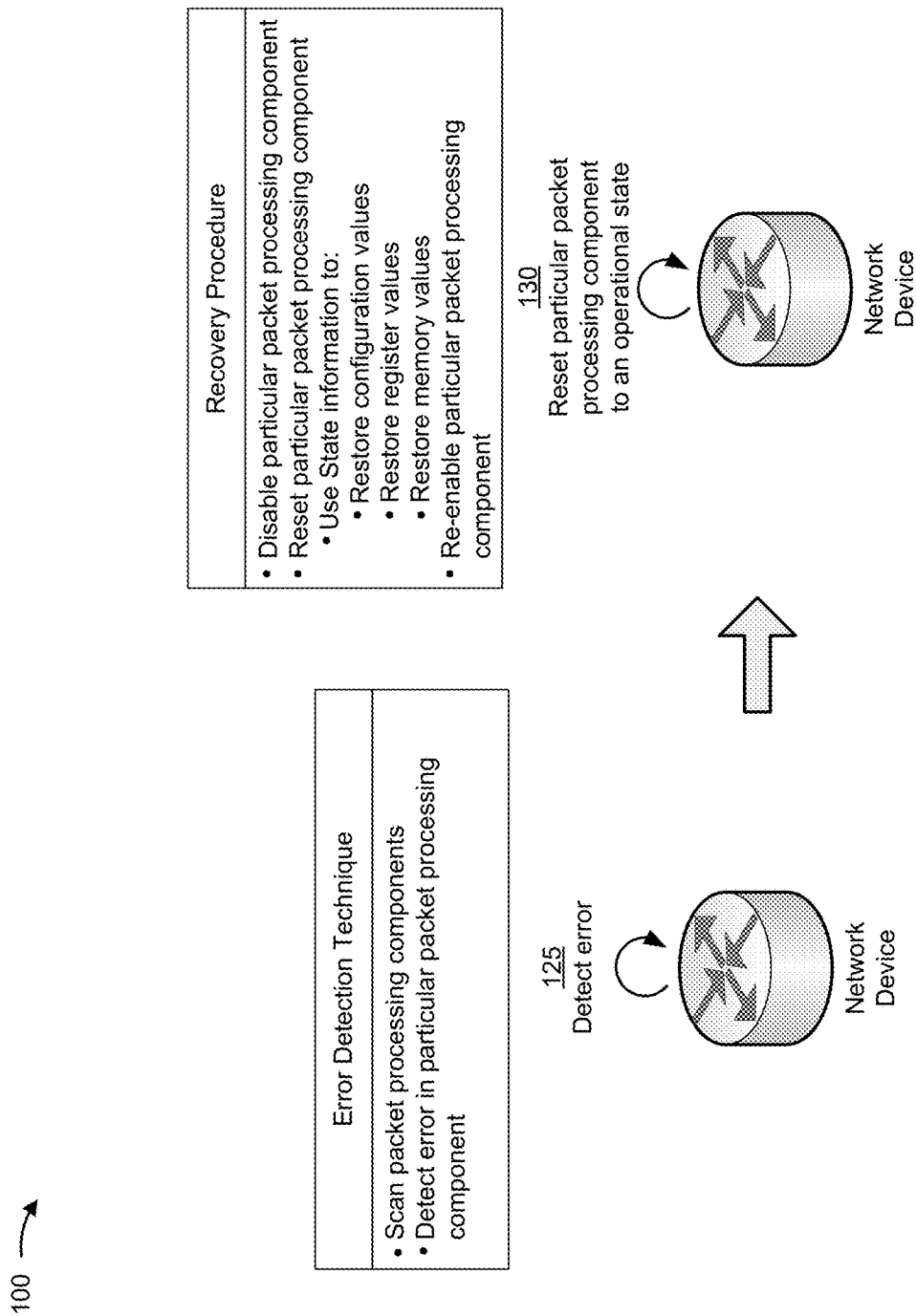

METHOD FOR RESETTING A PACKET PROCESSING COMPONENT TO AN OPERATIONAL STATE

BACKGROUND

A network device may include one or more packet processing components. For example, the network device may include one or more packet processing components for performing packet switching functions, packet routing functions, route lookup functions, and/or the like.

SUMMARY

According to some possible implementations, a network device may include one or more memories and one or more processors. The network device may include a plurality of packet processing components that receive traffic associated with one or more services. The network device may store state information for each of the plurality of packet processing components, while the plurality of packet processing components are receiving the traffic. The state information for a packet processing component, of the plurality of packet processing components, may include state information for the packet processing component and/or internal storage information for the packet processing component. The state information may be stored using a data structure that is internal to the network device and external to the packet processing component. The network device may detect an error that prevents the packet processing component from processing at least a portion of the traffic. The network device may execute, based on detecting the error that prevents the packet processing component from processing at least the portion of the traffic, a recovery procedure that uses the state information to reset the packet processing component to an operational state.

According to some possible implementations, a non-transitory computer-readable medium may store instructions that, when executed by one or more processors of a network device, cause the one or more processors to receive traffic associated with one or more services. The traffic received by the one or more processors may also be received is by a plurality of packet processing components. The one or more instructions may cause the one or more processors to store state information for each of the plurality of packet processing components, while the plurality of packet processing components are receiving the traffic. The state information for a packet processing component, of the plurality of packet processing components, may include state configuration information for the packet processing component and internal storage information for the packet processing component. The state information may be stored using a data structure that stores the state information for a limited time period. The one or more instructions may cause the one or more processors to detect an error that prevents the packet processing component from processing at least a portion of the traffic. The one or more instructions may cause the one or more processors to execute, based on detecting the error that prevents the packet processing component from processing at least the portion of the traffic, a recovery procedure that uses the state information to reset the packet processing component to an operational state. The plurality of packet processing components, except for the packet processing component, may receive traffic while the recovery procedure is being executed.

According to some possible implementations, a method may include receiving, by a plurality of packet processing components of a network device, traffic associated with a network. The method may include storing, by the network device, state information for each of the plurality of packet processing components, while the plurality of packet processing components are receiving the traffic. The state information for a packet processing component, of the plurality of packet processing components, may include state configuration information for the packet processing component and/or internal storage information for the packet processing component. The method may include detecting, by the network device, an error that prevents the packet processing component from processing at least a portion of the traffic. The method may include executing, by the network device and based on detecting the error that prevents the packet processing component from processing at least the portion of the traffic, a recovery procedure that uses the state information to reset the packet processing component to an operational state.

BRIEF DESCRIPTION OF THE DRAWINGS

FIGS. 1A-1C are diagrams of an overview of an example implementation described herein;

DETAILED DESCRIPTION

Figure 1A:
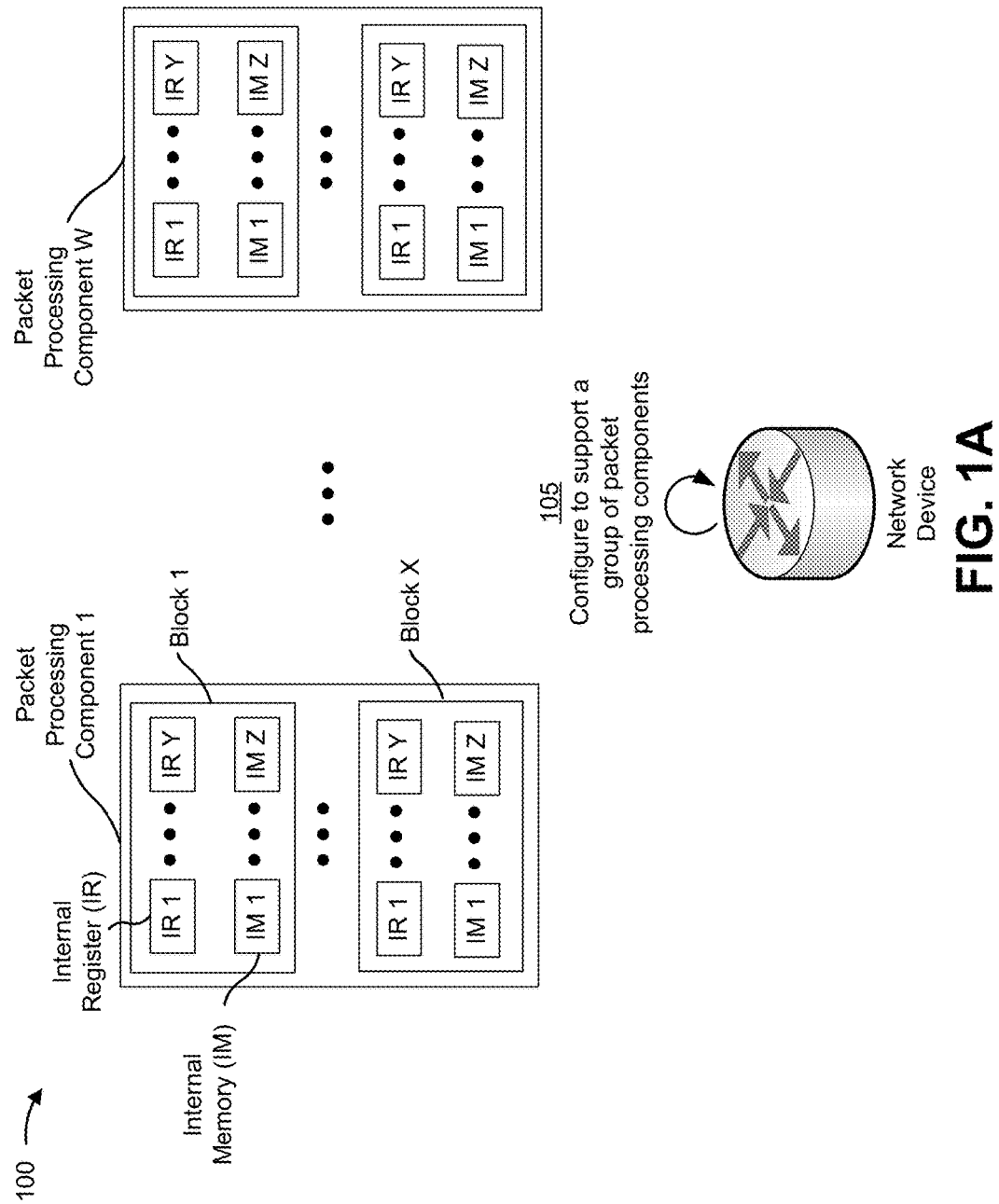

The following detailed description of example implementations refers to the accompanying drawings. The same reference numbers in different drawings may identify the same or similar elements.

As demand for data services increase, the amount of traffic that a network device handles may increase. For example, a network device may be manufactured to support a higher number of packet processing components, a higher number of links within the network devices (e.g., ports, virtual local area networks (VLANs), etc.), links with higher capacity (e.g., to allow the links to receive higher volumes of traffic), and/or the like.

However, increasing the amount of traffic that the network device handles may increase a number of errors that may occur and inhibit traffic flow (e.g., a hardware error, a software error, etc.). Additionally, if an error prevents a packet processing component of the network device from processing traffic, the network device may need to restart or perform a procedure to repair the error, during which the network device may be unable to process any traffic. For example, if a network device supports eight (or more) packet processing components, and an error prevents a particular packet processing component from processing traffic, the entire network device may need to restart to correct the error, or the entire network device may need to be taken offline to perform the procedure to correct the error. During the restart time or the time needed to perform the procedure to correct the error, the network device may be unable to process any traffic, despite that only one of the packet processing components is experiencing an error.

Some implementations described herein provide a network device that stores state information for a group of packet processing components, such that the network device is able to utilize the state information to reset a particular packet processing component when an error occurs. For example, the network device may include a group of packet processing components, and may store state information for each packet processing component while the group of packet processing components are processing traffic.

In this case, the network device may detect an error that prevents a particular packet processing component from processing traffic. Additionally, the network device may, based on detecting that the error is preventing the particular packet processing component from processing traffic, execute a recovery procedure that uses the state information to reset the particular packet processing component to an operational state.

In this way, the network device is able to reset the particular packet processing component without disrupting traffic flow for the other packet processing components in the group of packet processing components. Furthermore, the network device conserves processing resources that might otherwise be used to perform the recovery procedure on the other packet processing components, conserves network resources by reducing an amount of traffic that has to be retransmitted and/or rerouted when an error occurs, conserves processing resources relative to an inferior network device that has to perform the recovery procedure on all packet processing components, and/or the like.

Figure 1B:
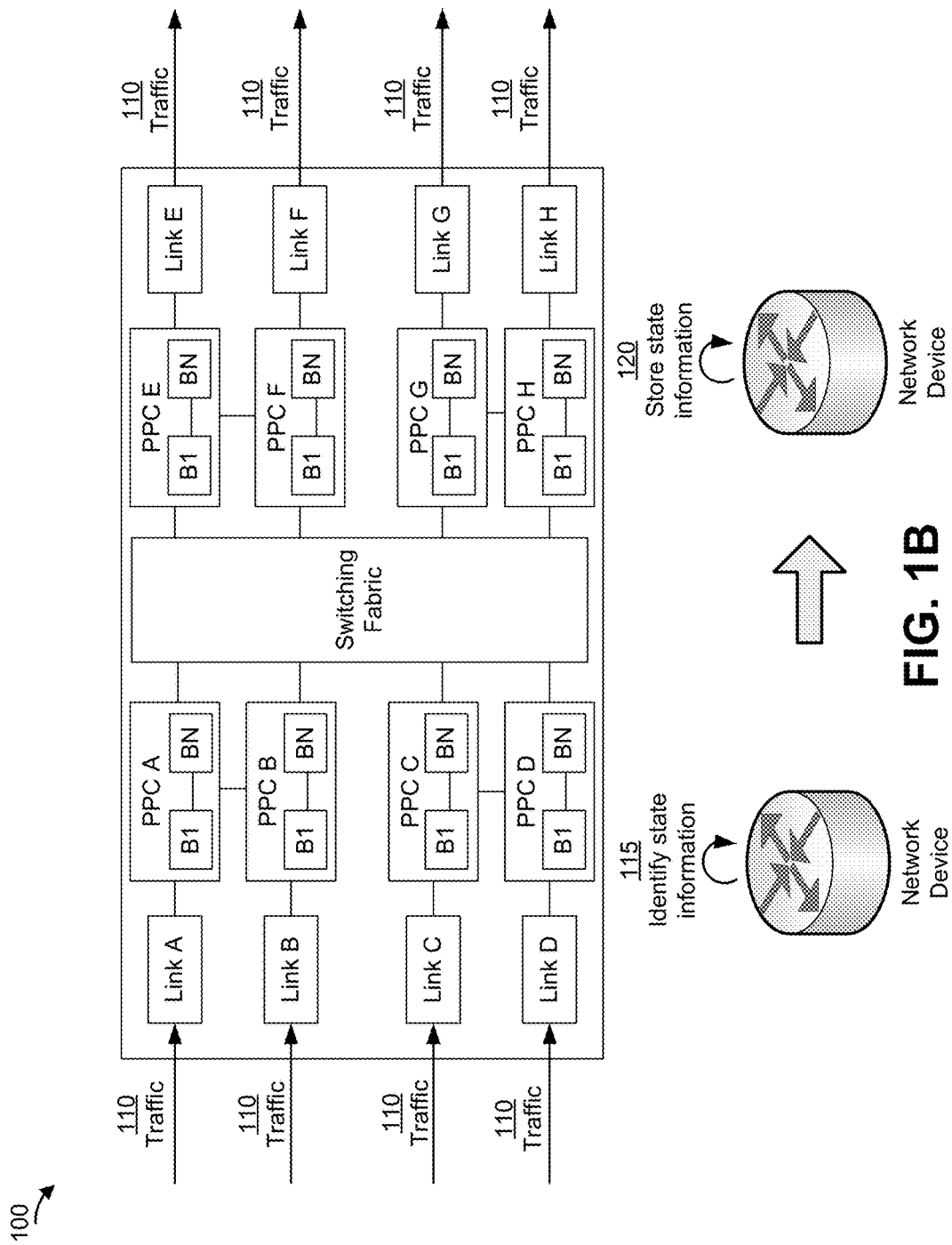

FIGS. 1A-1C are diagrams of an overview of an example implementation 100 described herein. As shown in FIGS. 1A-1C, example implementation 100 may include a network device that stores state information for a group of packet processing components, that detects an error associated with a particular packet processing component, and that performs a recovery procedure that uses the state information to reset the packet processing component to an operational state.

As shown in FIG. 1A, and by reference number 105, the network device may be configured to support a group of packet processing components (shown as Packet Processing Component 1 through Packet Processing Component W, W≥1). In some implementations, each packet processing component may be segmented into a set of blocks (shown as Block 1 through Block X, X≥1) that are physical regions within an integrated circuit that is supporting a packet processing component.

In some implementations, each packet processing component may be configured such that circuitry and/or logic used to perform packet routing functions and/or packet processing functions may be distributed between the set of blocks. For example, the set of blocks for a packet processing component may include one or more blocks that support logic that allow links (e.g., ports, virtual local area networks (VLANs), etc.) to receive packets, one or more blocks that support logic for assigning priority levels to packets, one or more blocks that support logic for performing load balancing decisions, one or more blocks that support logic for processing unidentifiable or problematic packets, one or more blocks that support logic for performing packet tracking functions, one or more blocks that support logic for routing the packets to other components of the network device (e.g., a switching fabric, another packet processing component, etc.), and/or the like.

Additionally, each block, of the set of blocks, may include a set of internal registers (shown as Internal Register 1 through Internal Register Y, Y≥1). The set of internal registers may include an internal register capable of being used to route packets within a block, an internal register capable of determining how to process packets within a block, an internal register capable of routing packets between blocks, an internal register capable of monitoring errors within a block, and/or the like. Additionally, or alternatively, the set of blocks may include internal memory (shown as Internal Memory 1 through Internal Memory Z, Z≥1) for storing state information associated with the packet processing component, as described below.

In practice, a network device may be configured to support up to eight, sixteen, or more, packet processing components. Additionally, each packet processing component may have a hundred, five hundred, or more, blocks with circuitry and/or logic for performing routing functions and/or processing functions. Additionally, each block may have a thousand, ten thousand, or more, internal registers, and/or ten, fifty, a hundred, or more, internal memories.

In this way, the network device is able to be configured with a group of packet processing components that are able to support large volumes of traffic.

As shown in FIG. 1B, and by reference number 110, the network device may receive traffic (e.g., packets) through a set of links (shown as Link A through Link D). Additionally, the traffic may be routed through the each link, of the set of links, to particular packet processing components (shown as Packet Processing Component A through Packet Processing Component D). In this case, the particular packet processing components may process and/or route traffic to a switching fabric, which may process and/or route the traffic to additional packet processing components (shown as Packet Processing Component E through Packet Processing Component H). Furthermore, the additional packet processing components may transmit the traffic to another device (e.g., another network device, a user device, a server device, etc.) using another set of links (shown as Link E through Link H).

As shown by reference number 115, the network device may identify state information while receiving traffic. For example, as the group of packet processing components receives and/or processes the traffic, the network device may execute a scanning technique to identify state information for each packet processing component. In this case, the network device may identify the state information by scanning a set of internal registers (e.g., to determine values stored by each internal register), by scanning a set of internal memories (e.g., to determine values stored within each internal memory), and/or the like.

The state information for a particular packet processing component may include state configuration information and/or internal storage information. The state configuration information may include initialization instructions that allow one or more elements (e.g., links, blocks, internal registers, internal memories, etc.) of the particular packet processing component to receive, process, store, and/or provide traffic at run-time. In this case, the initialization instructions may be used to configure a set of links to be able to route traffic to the particular packet processing component, to configure circuitry and/or logic associated with a set of blocks to be able to perform packet routing functions and/or packet processing functions, to configure a set of internal registers to be able to support packet routing and/or packet processing functions, and/or the like.

The internal storage information may include values that are stored within the particular packet processing component. For example, the internal storage information may include register values for the set of internal registers, memory values for the set of internal memories, and/or the like. As an example, a block may include thousands of internal registers that, at a particular time period, may each store register values that are used for packet routing and/or packet processing functions.

As shown by reference number 120, the network device may store state information. For example, the network device may store state information using a data structure, such as by storing the state information using random access memory (RAM), a memory cache (e.g., a dynamic RAM (DRAM) memory cache), a data structure that stores memory for a limited time period, and/or the like. In some cases, the data structure may be external to the packet processing component. For example, if the packet processing component malfunctions or is unable to process packets, the network device may need to execute a recovery procedure that clears all (or some) data structures within the packet processing component. As such, the state information may need to be stored in a location that is external to the packet processing component.

In this way, the network device is able to identify and store state information for each packet processing component.

As shown in FIG. 1C, and by reference number 125, the network device may detect an error that prevents a particular packet processing component from receiving and/or processing packets. For example, the network device may execute an error detection technique to scan the group of packet processing components, where the scan is able to detect an error that prevents a particular packet processing component from processing packets. In some cases, the set of internal registers of the particular packet processing component may be configured to store a particular bit value if a particular error occurs, which may allow the network device to scan the set of internal registers in order to detect the error.

In some implementations, the error may be a hardware error associated with the packet processing component, such as an error on a link, a block, an internal register, an interconnect, and/or the like. The hardware error may be caused by a power issue, a temperature issue (e.g., overheating), an equipment degradation issue (e.g., equipment may begin to malfunction as the equipment ages), and/or the like. Additionally, or alternatively, the error may be a software error, such as an error relating to data transmission (e.g., a forward error correction (FEC) error, a cyclic redundancy check (CRC) error, a bit error rate (BER) error, etc.), a signal integrity issue (e.g., a signal-to-noise (SNR) related error), and/or the like.

As shown by reference number 130, the network device may execute a recovery procedure to reset the particular packet processing component to an operational state. For example, the network device may begin the recovery procedure by disabling the particular packet processing component, such that the particular packet processing component is no longer able to receive and/or process traffic. While the particular packet processing component is disabled, the network device may execute a load balancing technique to ensure that the remaining packet processing components are able to support traffic that would otherwise be sent to the particular packet processing component.

Additionally, the network device may use the state information to reset the packet processing component to the operational state. For example, the network device may obtain the state information (e.g., the configuration information, the internal storage information, etc.) from the data structure, wherein the state information represents a state of the particular packet processing component before the error occurred. In this case, the network device may use the configuration information to restore configuration values for the particular packet processing component. Additionally, the network device may use the internal storage information to restore register values to each internal register and/or to restore memory values to each internal memory.

Additionally, the network device may re-enable the particular packet processing component. For example, the network device may re-enable the particular packet processing component such that the entire group of packet processing components is able to process traffic.

In some implementations, the network device may only have to execute the recovery procedure on one or more elements of the particular packet processing component. For example, rather than disable the entire particular packet processing component, the network device may disable one or more elements of the particular packet processing component (e.g., one or more links, circuitry or logic associated with one or more blocks, one or more internal registers, etc.), and may execute the recovery procedure on the one or more elements that have been disabled, as described in detail further herein.

In this way, the network device is able to incur an error on a particular packet processing component, and detect and correct the error without having to reset the entire network device (e.g., by resetting only the particular packet processing component or one or more elements of the particular packet processing component). Furthermore, by performing a recovery procedure that does not disrupt traffic flow for the other packet processing components and/or for portions of the particular packet processing component, the network device conserves processing resources and/or network resources relative to an inferior network device that has to perform a recovery procedure that disrupts traffic flow for all packet processing components.

As indicated above, FIGS. 1A-1C are provided merely as an example. Other examples are possible and can differ from what was described with regard to FIGS. 1A-1C. For example, there can be additional devices and/or networks, fewer devices and/or networks, different devices and/or networks, or differently arranged devices and/or networks than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of example implementation 100 can perform one or more functions described as being performed by another set of devices of example implementation 100.

Figure 2:
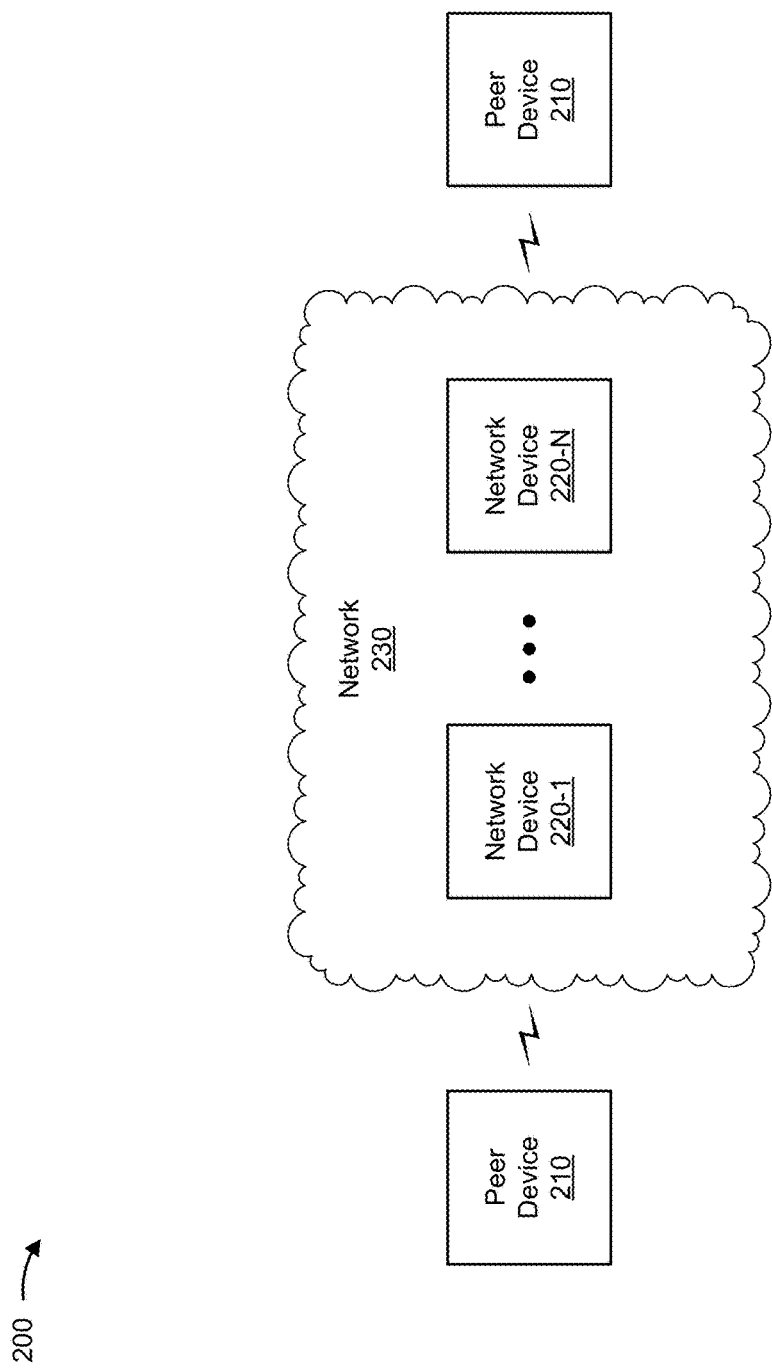
FIG. 2 is a diagram of an example environment in which systems and/or methods, described herein, may be implemented.

As shown in FIG. 2, environment 200 may include one or more peer devices 210, one or more network devices 220-1 through 220-N (N≥1) (hereinafter referred to collectively as "network devices 220", and individually as "network device 220"), and a network 230. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a load balancer, or a similar type of device. Additionally, or alternatively, peer device 210 may include an endpoint device that is a source or a destination for network traffic. For example, peer device 210 may include a computer, a server device, a mobile device, or a similar type of device. Peer device 210 may receive network traffic from and/or may provide network traffic to other peer devices 210 via network 230 (e.g., by routing packets using network device(s) 220 as an intermediary).

Network device 220 includes one or more devices capable of receiving, processing, storing, routing, and/or providing traffic. For example, network device 220 may include a router, such as a label switching router (LSR), a label edge router (LER), an ingress router, an egress router, a provider router (e.g., a provider edge router, a provider core router, etc.), a virtual router, or the like. Additionally, or alternatively, network device 220 may include a gateway, a switch, a firewall, a hub, a bridge, a reverse proxy, a server (e.g., a proxy server, a cloud server, a data center server, etc.), a load balancer, or a similar device. In some implementations, network device 220 may be a physical device implemented within a housing, such as a chassis. In some implementations, network device 220 may be a virtual device implemented by one or more computer devices of a cloud computing environment or a data center. In some implementations, network device 220 may receive traffic from peer device 210 and/or from another network device 220.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
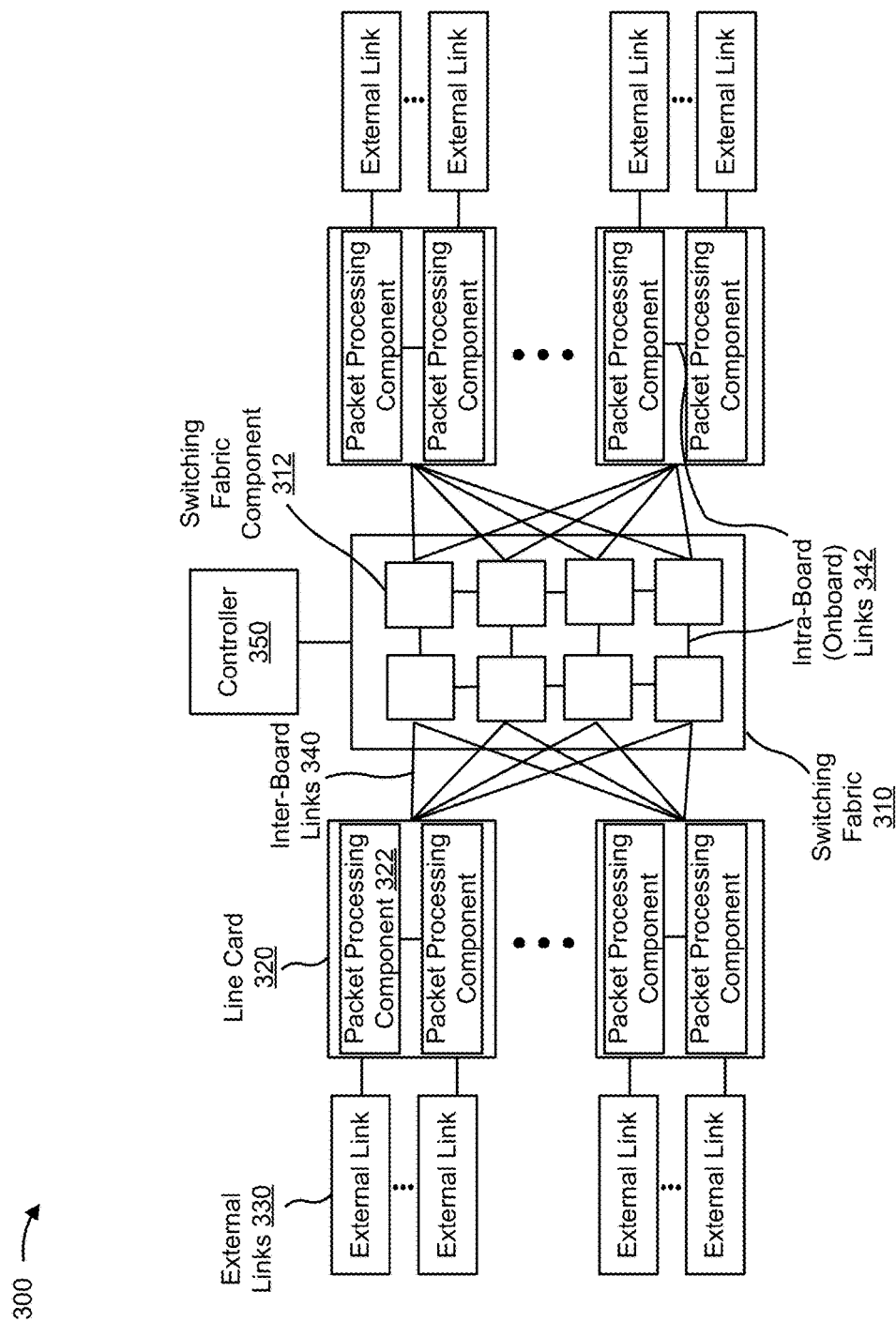
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300.

As shown in FIG. 3, device 300 may include a switching fabric 310, a set of switching fabric components 312, a set of line cards 320 that support a set of packet processing components 322, a set of external links 330, a set of inter-board links 340, a set of intra-board (onboard) links 342, and/or a controller 350. In some implementations, traffic between switching fabric 310 and controller 350 may be provided and/or received through a single internal link. In some implementations, traffic between switching fabric 310 and controller 350 may be provided and/or received through a set of inter-board links 340, where each inter-board link 340 may be designated for a subset of external links 330 and/or a subset of line cards 320. In some implementations, line card 320 may use a set of inter-board links 340 to communicate with one or more corresponding planes of a switching fabric 310.

Switching fabric 310 interconnects external links 330 via line cards 320. In some implementations, switching fabric 310 may be implemented using one or more switching fabric components 312 (e.g., one or more crossbars, one or more busses, one or more shared memories, and/or one or more planes). In some implementations, switching fabric components 312 may be connected using intra-board (onboard) links 342. In some implementations, switching fabric 310 may enable external links 330 to communicate. For example, switching fabric 310 may connect with one or more line cards 320 via a set of inter-board links 340, and the one or more line cards 320 may connect with the external links 330, as described further herein.

Line cards 320 include one or more line card components 322. For example, line cards 320 may include a modular electronic circuit designed to fit on a printed circuit board (PCB), and may include one or more packet processing components 322. Packet processing component 322 may include one or more processors to process packets, and may process incoming traffic, such as by performing data link layer encapsulation or decapsulation. In some implementations, packet processing component 322 may receive a packet from switching fabric 310, may process the packet, and may output the processed packet to an appropriate external link 330 connected to packet processing component 322. Additionally, or alternatively, packet processing component 322 may receive a packet from external link 330, may process the packet, and may output the processed packet to switching fabric 310 for transfer to controller 350 and/or to another external link 330 (e.g., via the same packet processing component 322 or a different packet processing component 322).

External link 330 is a point of attachment for physical links (e.g., a port) or virtual links (e.g., a virtual local area network (VLAN)), and may be a point of ingress and/or egress for incoming and/or outgoing traffic, such as packets. In some implementations, a single line card 320 may be connected to multiple external links 330. In some implementations, a single line card 320 may be connected to a single external link 330. External link 330 may permit communication between a first network device 220 and a second network device 220 that is a neighbor of the first network device 220. External link 330 may store packets (e.g., in a buffer) and/or may schedule packets for transmission on output physical links. External link 330 may support data link layer encapsulation or decapsulation and/or a variety of higher-level protocols.

Inter-board link 340 is a path that allows line card 320 and/or controller 350 to communicate with switching fabric 310. Inter-board link 340 may include, for example, a wired or wireless path, such as a fiber-optic path, an electrical path, a virtual path, or the like. In some implementations, there may be multiple inter-board links 340 between a single packet processing component 322 and switching fabric 310. In some implementations, there may be a single inter-board link 340 between controller 350 and switching fabric 310. Intra-board (onboard) link 342 is a path that allows interconnection between line card components 322 and/or switching fabric components 312 (e.g., a physical connection, a virtual connection, etc.).

Controller 350 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 350 may include one or more processors that may be programmed to perform a function. In some implementations, controller 350 may include a group of virtual devices that each includes one or more processors.

In some implementations, controller 350 may include a random access memory (RAM), a read only memory (ROM), and/or another type of dynamic or static storage device (e.g., a flash memory, a magnetic memory, an optical memory, etc.) that stores information and/or instructions for use by controller 350.

In some implementations, controller 350 may communicate with other devices, networks, and/or systems connected to device 300 to exchange information regarding network topology. Controller 350 may create routing tables based on the network topology information, create forwarding tables based on the routing tables, and forward the forwarding tables to packet processing component 322, such as for use in performing route lookups for incoming and/or outgoing packets.

Controller 350 may perform one or more processes described herein. Controller 350 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 350 from another computer-readable medium or from another device via a communication interface. When executed, software instructions stored in a memory and/or storage component associated with controller 350 may cause controller 350 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
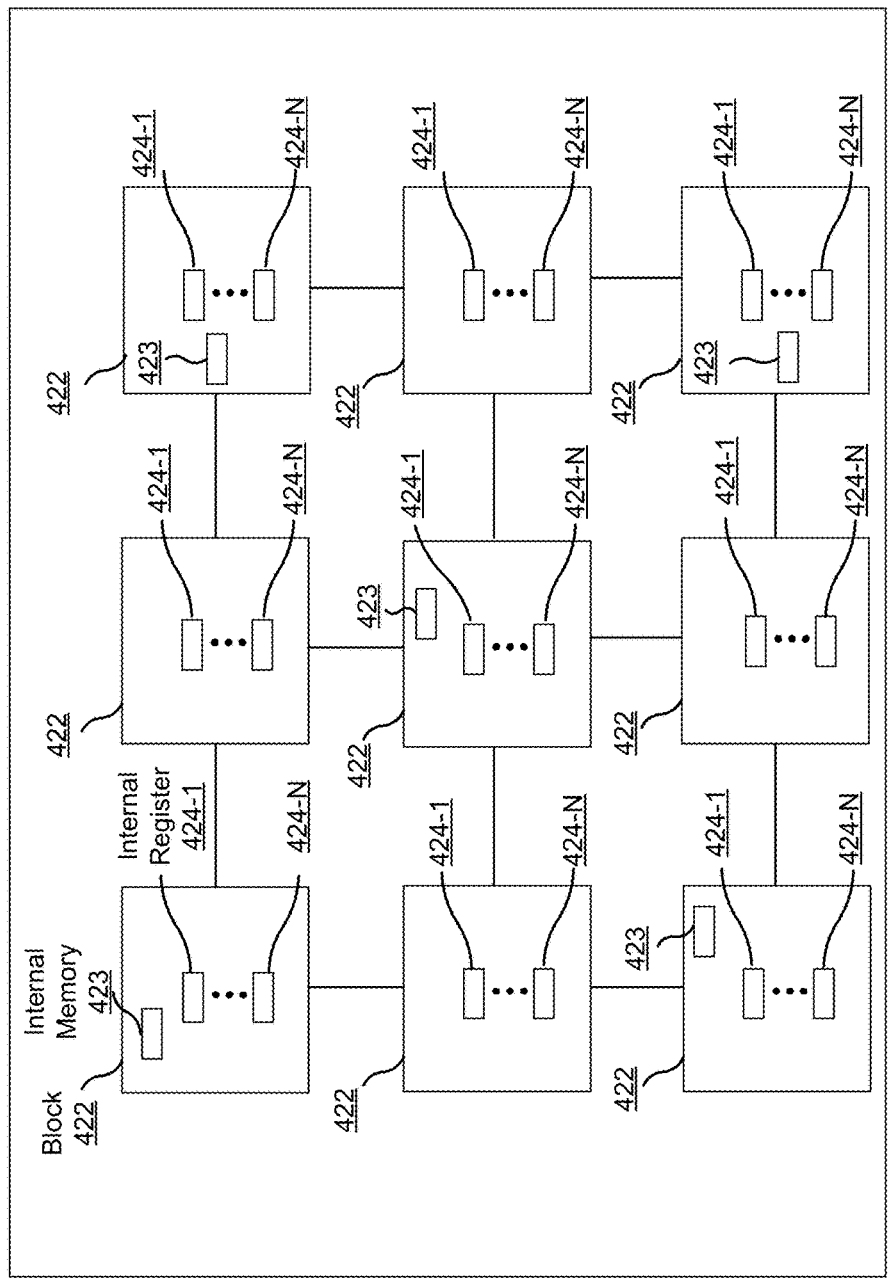
FIG. 4 is a diagram of example elements of one or more example components of FIG. 3.

FIG. 4 is a diagram of example elements of one or more components of FIG. 3. Component 400 may correspond to packet processing component 322. In some implementations, packet processing component 322 may include one or more components 400 and/or one or more elements of component 400.

As shown in FIG. 4, component 400 may include a set of blocks 422, a set of internal memories 323, and/or a set of internal registers 424. In some implementations, component 400 may be supported by one or more integrated circuits (e.g., one or more ASICs). In some implementations, component 400 may be segmented into a set of blocks 422 that are physical regions within the one or more integrated circuits that support component 400.

In some implementations, the set of blocks 422 may include one or more blocks 422 that support logic that allow links (e.g., ports, virtual local area networks (VLANs), etc.) to receive packets, one or more blocks 422 that support logic for assigning priority levels to packets, one or more blocks 422 that support logic for performing load balancing decisions, one or more blocks 422 that support logic for processing unidentifiable or problematic packets, one or more blocks 422 that support logic for performing packet tracking functions, one or more blocks 422 that support logic for routing the packets to other components of network device 220 (e.g., a switching fabric, another packet processing component, etc.), and/or the like.

As an example, a first block 422 (e.g., shown as the top left block in FIG. 4) may be used to manage link configuration for component 400. Additionally, a second block 422 (e.g., shown as the block to the right of the first block 422) may be used to assign priority levels to packets. Additionally, a third block 422 (e.g., shown as the block to the right of the second block 422) may be used to perform load balancing decisions for component 400. In this way, circuitry and/or logic within each block 422 may be used to perform different packet routing and/or packet processing functions.

In some implementations, one or more blocks 422, of the set of blocks 422, may include one or more internal memories 423. For example, the one or more internal memories 423 may include a random access memory (RAM), a read only memory (ROM), and/or another type of dynamic or static storage device (e.g., a flash memory, a magnetic memory, an optical memory, etc.) that stores information and/or instructions for use by component 400.

In some implementations, internal memory 423 may store state information for component 400. For example, internal memory 423 may store state configuration information and/or internal storage information. As an example, internal memory 423 may store configuration instructions for one or more links, one or more blocks 422, and/or the like. As another example, internal memory 423 may store memory values relating to a particular routing functions and/or processing functions.

In some implementations, the set of blocks 422 may include the set of internal registers 424. The set of internal registers 424 may include a hardware register (e.g., flip-flops, logic gates, etc.), a data register, an address register, a special-purpose register, a status register, and/or a similar type of register. In some implementations, the set of internal registers 424 may include an internal register 424 capable of being used to route packets within a block 422, an internal register 424 capable of determining how to process packets within a block 422, an internal register 424 capable of routing packets between blocks 422, an internal register 424 capable of monitoring errors within a block 422, and/or the like.

In some implementations, the set of blocks 422 may be connected by one or more links. For example, the set of blocks 422 may be connected by intra-board links 342, as described above.

The number and arrangement of elements shown in FIG. 4 are provided as an example. In practice, component 400 may include additional elements, fewer elements, different elements, or differently arranged elements than those shown in FIG. 4. Additionally, or alternatively, a set of elements (e.g., one or more components) of component 400 may perform one or more functions described as being performed by another set of elements of component 400.

Figure 5:
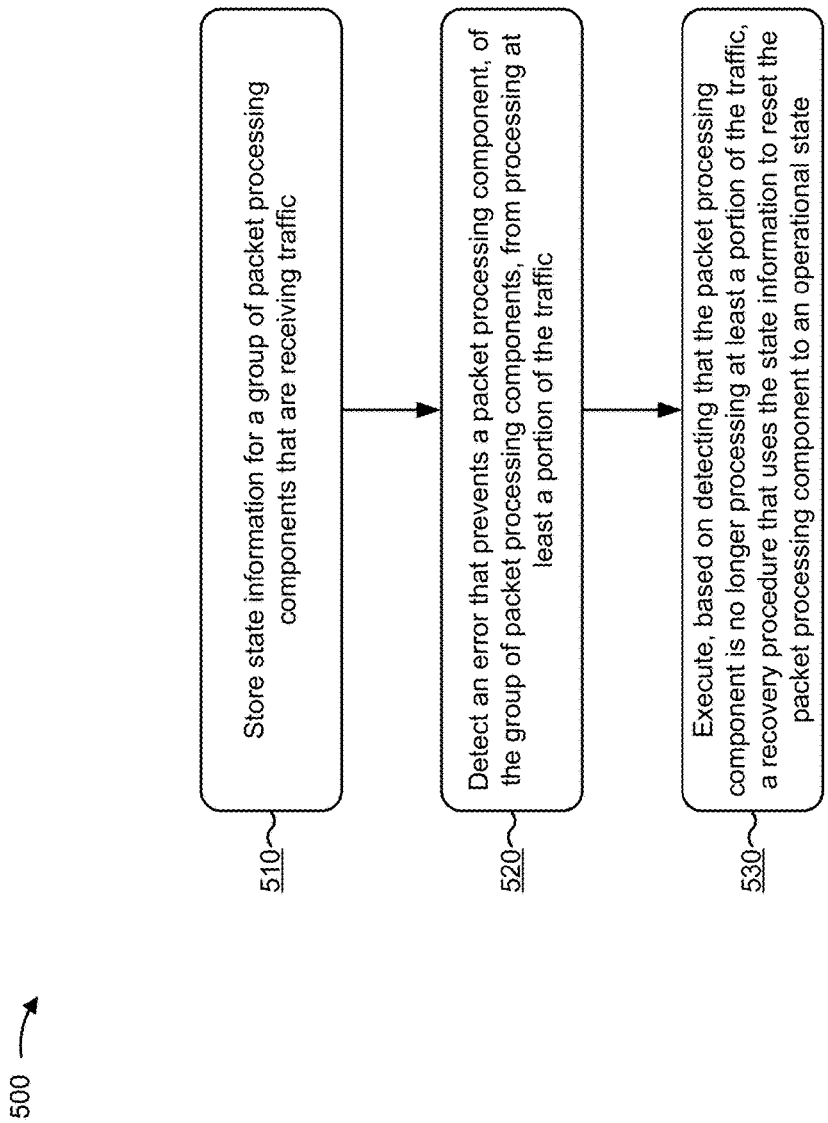
FIG. 5 is a flow chart of an example process for detecting an error associated with a packet processing component and performing a recovery procedure that uses state information to reset the packet processing component to an operational state.

FIG. 5 is a flow chart of an example process 500 for detecting an error associated with a packet processing component and performing a recovery procedure that uses state information to reset the packet processing component to an operational state. In some implementations, one or more process blocks of FIG. 5 may be performed by network device 220. In some implementations, one or more process blocks of FIG. 5 may be performed by another device or a group of devices separate from or including network device 220, such as peer device 210.

As shown in FIG. 5, process 500 may include storing state information for a group of packet processing components that are receiving traffic (block 510). For example, network device 220 (e.g., controller 350, a data structure external to packet processing components 322, etc.) may identify state information for a group of packet processing components 322 that are receiving traffic, and may store the state information using a data structure. The state information may include state configuration information and/or internal storage information, as each described below.

The state configuration information may include initialization instructions that allow one or more elements of the packet processing component 322 (e.g., links, such as external links 330, inter-board links, and/or intra-board (onboard) links 342, blocks 422, internal registers 424, internal memories 434, etc.) to receive, process, store, and/or provide traffic at run-time. For example, the state configuration information may include link configuration instructions that may be used to configure a set of links to route traffic to the packet processing component 322. In this example, the link configuration instructions may include link identification values (e.g., a port identifier (ID), a VLAN ID, etc.), link capacity values (e.g., indicating an amount of bandwidth that a link may process at a particular time period), and/or the like.

As another example, the state configuration information may include block configuration instructions to configure circuitry and/or logic associated with a set of blocks 422 to be able to perform packet routing functions and/or packet processing functions. In this example, the block configuration instructions may include routing instructions (e.g., a routing table or a forwarding table may instruct an element of packet processing component 322 on where to route a packet), scheduling instructions (e.g., a packet may be assigned a particular priority, and the scheduling instructions may indicate which priority to assign to the packet), and/or the like.

As another example, the state configuration information may include register configuration instructions to configure a set of internal registers 424 to be able to support packet routing and/or packet processing functions. In this example, the register configuration instructions may include instructions indicating when an internal register is to accept or reject traffic, instructions when the internal register is to route traffic to another internal register or to another block, instructions on when an internal register is to store an indicator of an error, instructions indicating when an internal register is to store an indicator that may be used to track packets, and/or the like.

The internal storage information may include values that are stored within the packet processing component 322 and that are created from the packet processing component 322 performing the packet routing and/or packet processing functions. For example, the internal storage information may include register values for the set of internal registers 424, memory values for the set of internal memories 423, and/or the like, at a time period when the packet processing component 322 is performing the packet routing and/or packet processing functions.

To illustrate a register value that may be stored by an internal register 424 (and subsequently stored as part of the internal storage information), assume the internal register 424 is configured to count packets. In this case, a register value for the internal register 424 may be a value that keeps track of a total number of packets that have been processed. In practice, the internal storage information may store register values for tens of thousands of internal registers 424, hundreds of thousands of internal registers 424, or more, whereby each register value may change dynamically as traffic is processed.

In some implementations, in addition to storing the configuration information and the internal storage information, network device 220 may also store packet tracking information. For example, network device 220 may store packet tracking information for packets associated with a client, such that packet statistics may be generated and provided to a device associated with the client (e.g., to monitor routing performance). Because the client may request packet statistics for the entire network device 220, network device 220 may store the packet tracking information externally to each packet processing component 322. This may allow the packet tracking information for each packet processing component 322 to be combined to provide the device associated with the client with the packet statistics.

In some implementations, network device 220 may be configured to support a group of packet processing components 322. In some implementations, the group of packet processing components 322 may be supported by one or more integrated circuits (e.g., one or more application-specific integrated circuits (ASICs), etc.). In some implementations, a packet processing component 322 may be segmented into a set of blocks 422 that are physical regions within an integrated circuit that is supporting the packet processing component 322.

In some implementations, a packet processing component 322 may be configured such that circuitry and/or logic used to perform packet routing functions and/or packet processing functions may be distributed between the set of blocks 422. For example, the set of blocks 422 for a packet processing component may include one or more blocks 422 that support logic that allow links (e.g., ports, virtual local area networks (VLANs), etc.) to receive packets, one or more blocks 422 that support logic for assigning priority levels to packets, one or more blocks 422 that support logic for performing load balancing decisions, one or more blocks 422 that support logic for processing unidentifiable or problematic packets, one or more blocks 422 that support logic for performing packet tracking functions, one or more blocks 422 that support logic for routing the packets to other components of the network device (e.g., a switching fabric, another packet processing component, etc.), and/or the like.

Additionally, each block 422, of the set of blocks 422, may include a set of internal registers 424. The set of internal registers 424 may include an internal register 424 capable of being used to route packets within a block 422, an internal register 424 capable of determining how to process packets within a block 422, an internal register 424 capable of routing packets between blocks 422, an internal register 424 capable of monitoring errors within a block 422, and/or the like. Additionally, or alternatively, the set of blocks 422 may include internal memory 423 for storing state information associated with the packet processing component 322, as described below.

In some implementations, network device 220 may receive traffic through a set of links. Additionally, the traffic may be routed through the each link, of the set of links, to packet processing components 322. In this case, packet processing components 322 may process and/or route traffic to switching fabric 310, which may process and/or route the traffic to additional packet processing components 322. Furthermore, the additional packet processing components 322 may transmit the traffic to peer device 210 and/or another network device 220 using another set of links.

In some implementations, network device 220 may identify state information for a packet processing component 322. For example, network device 220 may execute a scanning technique to identify the state information for the packet processing component 322. In this case, network device may 220 may identify the state information by scanning a set of internal registers 424 (e.g., to determine values stored by each internal register 424), by scanning a set of internal memories 423 (e.g., to determine values stored within internal memory 423), and/or the like.

In some implementations, network device 220 may store the state information using a data structure. For example, network device 220 may store the state information using random access memory (RAM), a memory cache (e.g., a dynamic RAM (DRAM) memory cache), a data structure that stores memory for a limited time period, and/or the like. In some cases, the data structure may be external to the packet processing component 322. For example, if the packet processing component 322 malfunctions or is unable to process packets, network device 220 may need to execute a recovery procedure that clears the values included in the set of internal registers 424 and the values included in the set of internal memories 423. As such, the state information may need to be stored in a location that is external to the packet processing component.

In some implementations, network device 220 may continue to store state information. For example, while packet processing component 322 is receiving traffic, network device 220 may be configured to periodically identify and store new instances of the state information (e.g., every second, every ten seconds, every minute, etc.). In this case, network device 220 ensures that if an error occurs, that state information is stored for a state that occurred right before the error (e.g., within a second, ten seconds, a minute, of the error occurring).

In this way, network device 220 is able to store state information for the packet processing component 322.

As further shown in FIG. 5, process 500 may include detecting an error that prevents a packet processing component, of the group of packet processing components, from processing at least a portion of the traffic (block 520). For example, network device 220 (e.g., packet processing component 322, controller 350, etc.) may execute an error detection technique to scan the group of packet processing components 322, where the scan is able to detect an error that prevents a packet processing component 322 from processing at least a portion of the traffic.

In some implementations, the error may be a hardware error associated with the packet processing component 322, such as an error on a link (e.g., an external link 330, an inter-board link 340, an intra-board (onboard) link 342, etc.), a block 422, an internal register 424, an internal memory 423, an interconnect 425, and/or the like. The hardware error may be caused by a power issue, a temperature issue (e.g., overheating), an equipment degradation issue (e.g., equipment may begin to malfunction as the equipment ages), and/or the like. Additionally, or alternatively, the error may be a software error, such as an error relating to data transmission (e.g., a forward error correction (FEC) error, a cyclic redundancy check (CRC) error, a bit error rate (BER) error, etc.), a signal integrity issue (e.g., a signal-to-noise (SNR) related error), and/or the like.

In some implementations, network device 220 may execute the error detection technique to detect the error. For example, network device 220 may detect the error by scanning packet processing component 322 for status information (e.g., particular readings, measurements, properties, and/or the like) of one or more elements or data types associated with packet processing component 322. In this case, network device 220 may compare the status information to one or more error thresholds. If the status information satisfies the one or more error thresholds, network device 220 may detect the error. If the status information does not satisfy the error threshold, network device 220 may determine that there is not an error.

In some cases, one or more internal registers 424 may store bit values and/or bit count values that may be used as indicators of errors. For example, network device 220 may use the error detection technique to scan the one or more internal registers 424 to determine whether an internal register 424 is storing a register value identifying an error.

In this way, network device 220 is able to detect an error that prevents the packet processing component from processing at least a portion of the traffic.

As further shown in FIG. 5, process 500 may include executing, based on detecting that the packet processing component is no longer processing at least a portion of the traffic, a recovery procedure that uses the state information to reset the packet processing component to an operational state (block 530). For example, network device 220 (e.g., packet processing component 322, controller 350, etc.) may execute a recovery procedure that uses the state information to reset packet processing component 322 to an operational state.

The recovery procedure may include disabling the packet processing component 322 (or an element of packet processing component 322), using the state information to reset packet processing component 322 to an operational state, and re-enabling packet processing component 322 (or the element of packet processing component 322) to allow packet processing component 322 to continue to receive the traffic. The operational state may be a state in which packet processing component 322 is able to process the traffic without error.

In some implementations, network device 220 may disable packet processing component 322. For example, network device 220 may disable packet processing component 322 by taking packet processing component 322 offline, by shutting down packet processing component 322, by preventing packet processing component 322 from receiving traffic, and/or the like. While packet processing component 322 is disabled, network device 220 may execute a load balancing technique to ensure that the remaining packet processing components 322 are able to support traffic that would otherwise be sent to packet processing component 322.

In some implementations, network device 220 may reset packet processing component 322 to an operational state. For example, network device 220 may obtain the state information (e.g., the state configuration information, the internal storage information, etc.) from the data structure, wherein the state information represents a state of packet processing component 322 before the error occurred. In this case, network device 220 may use the state configuration information to restore link configuration instructions, block configuration instructions, and/or register configuration instructions. Additionally, network device 220 may use the internal storage information to restore register values for the set of internal registers 424 and/or memory values for the set of internal memories 423.

In some implementations, network device 220 may re-enable packet processing component 322. For example, network device 220 may re-enable packet processing component 322 to allow packet processing component 322 to again to receive traffic.

In some implementations, network device 220 may execute the recovery procedure on one or more elements of packet processing component 322. For example, rather than disable the entire packet processing component 322, network device 220 may disable one or more elements of packet processing component 322 (e.g., one or more links, circuitry or logic associated with one or more blocks 422, one or more internal registers 424, etc.), and may execute the recovery procedure on the one or more elements to reset the one or more elements to an operational state. While the recovery procedure is being executed, elements that have not been disabled may be able to continue to receive, process, and/or provide traffic.

As an example, network device 220 may disable one or more elements of packet processing component 322. In this case, network device 220 may obtain, from the data structure, state information associated with the one or more elements. Additionally, network device 220 may use the state information to restore link configuration instructions, block configuration instructions, and/or register configuration instructions for the one or more elements. Furthermore, network device 220 may use internal storage information to restore register values and/or memory values associated with the one or more elements. Additionally, network device 220 may re-enable the one or more elements, thereby allowing the one or more elements to continue to receive, process, and/or provide traffic. In this way, network device 220 conserves processing resources and/or network resources relative to an inferior network device that is unable to perform a recovery procedure on just one or more elements of the packet processing component 322.

In this way, network device 220 is able to reset the packet processing component 322 to an operational state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, network device 220 is able to reset packet processing component 322 without disrupting traffic flow for other packet processing components 322 in a group of packet processing components 322. Furthermore, network device 220 conserves processing resources that might otherwise be used to perform the recovery procedure on the other packet processing components 322, conserves network resources by reducing an amount of traffic that has to be retransmitted when an error occurs, conserves processing resources that relative to an inferior network device that has to perform the recovery procedure on all packet processing components 322, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors, communicatively coupled to the one or more memories to:
receive traffic associated with one or more services, wherein the traffic is received by a plurality of packet processing components;
store state information for each of the plurality of packet processing components, while the plurality of packet processing components are receiving the traffic, wherein the state information for a packet processing component, of the plurality of packet processing components, includes:
state configuration information for the packet processing component, and
internal storage information for the packet processing component, and
wherein the state information is stored using a data structure that is internal to the network device and external to the packet processing component;
detect an error that prevents the packet processing component from processing at least a portion of the traffic; and
execute, based on detecting the error that prevents the packet processing component from processing at least the portion of the traffic, a recovery procedure that uses the state information to reset the packet processing component to an operational state,
wherein the one or more processors, when executing the recovery procedure, are to:
disable the packet processing component,
obtain the state configuration information from the data structure,
restore configuration instructions for the packet processing component using the state configuration information,
obtain the internal storage information from the data structure,
restore register values to a set of internal registers using the internal storage information, and
re-enable the packet processing component.

2. The network device of claim 1, wherein the plurality of packet processing components, except for the packet processing component, receive traffic while the recovery procedure is being executed.

3. The network device of claim 1, wherein the one or more processors, when storing the state information for the packet processing component, are to:
analyze the packet processing component using a scanning technique to identify the state information,
wherein the one or more processors, when using the scanning technique to analyze the packet processing component, are to:
scan a set of internal memories to identify a portion of the state configuration information that includes memory values for the set of internal memories, and
scan a set of internal registers to identify another portion of the state configuration information that includes the register values for the set of internal registers, and
store the state information using the data structure that is external to the packet processing component.

4. The network device of claim 3,
wherein the data structure is a first data structure, and
wherein the one or more processors, when using the scanning technique to analyze the packet processing component, are to:
scan a second data structure that is external to the packet processing component to identify packet tracking information for the plurality of packet processing components, and
store the state information using the first data structure, wherein the state information includes the packet tracking information.

5. The network device of claim 1,
wherein the plurality of packet processing components, other than the packet processing component, receive traffic while the packet processing component is disabled, and
wherein the state configuration information includes the configuration instructions from before when the error occurred.

6. The network device of claim 1, wherein the one or more processors, when executing the recovery procedure, are further to:
disable an element, of a set of elements associated with the packet processing component, or a functionality associated with the element,
wherein the set of elements include at least one of:
a set of links associated with the packet processing component,
a set of blocks associated with the packet processing component, or
a set of internal registers associated with the packet processing component,
wherein the element is a link, of the set of links, a block, of the set of blocks, or an internal register, of the set of internal registers,
obtain state information for the element from the data structure,
use the state information for the element to reset the element to a state that the element was in before the error occurred, and
re-enable the element.

7. The network device of claim 1, wherein the one or more processors, when executing the recovery procedure, are further to:
restore memory values for a set of internal memories using the internal storage information.

8. A non-transitory computer-readable medium storing instructions, the instructions comprising:
one or more instructions that, when executed by one or more processors, cause the one or more processors to:
receive traffic associated with one or more services,
wherein the traffic is received is by a plurality of packet processing components;
store state information for each of the plurality of packet processing components, while the plurality of packet processing components are receiving the traffic,
wherein the state information for a packet processing component, of the plurality of packet processing components, includes:
state configuration information for the packet processing component, and
internal storage information for the packet processing component, and
wherein the state information is stored using a data structure that stores the state information for a limited time period;
detect an error that prevents the packet processing component from processing at least a portion of the traffic; and
execute, based on detecting the error that prevents the packet processing component from processing at least the portion of the traffic, a recovery procedure that uses the state information to reset the packet processing component to an operational state,
wherein the one or more instructions, that cause the one or more processors to execute the recovery procedure, cause the one or more processors to:
disable the packet processing component, obtain the state configuration information and internal storage information from the data structure, restore configuration instructions for the packet processing component using the state configuration information, restore register values to a set of internal registers using the internal storage information, and re-enable the packet processing component.

9. The non-transitory computer-readable medium of claim 8, wherein the data structure is a memory cache that is external to the packet processing component.

10. The non-transitory computer-readable medium of claim 8, wherein the one or more instructions, that cause the one or more processors to store the state information, cause the one or more processors to:

analyze the packet processing component using a scanning technique to identify the state information, wherein the one or more instructions, that cause the one or more processors to use the scanning technique to analyze the packet processing component, cause the one or more processors to:

scan a set of internal memories included in the packet processing component to identify:

the state configuration information, and a portion of the internal storage information that includes memory values for the set of internal memories, and scan a set of internal registers to identify another portion of the internal storage information that includes the register values for the set of internal registers, and store the state information using the data structure that is external to the packet processing component.

11. The non-transitory computer-readable medium of claim 8, wherein the one or more instructions, that cause the one or more processors to store the state information, cause the one or more processors to:

store the internal storage information for the packet processing component, wherein the internal storage information includes:

the register values for flail the set of internal registers, and memory values for a set of internal memories associated with the packet processing component.

12. The non-transitory computer-readable medium of claim 8, wherein the one or more instructions, that cause the one or more processors to execute the recovery procedure, further cause the one or more processors to:

disable an element, of a set of elements associated with the packet processing component, or a functionality associated with the element, wherein the set of elements except for the element are able to continue receiving traffic, obtain state information for the element from the data structure, use the state information for the element to reset the element to a state that the element was in before the error occurred, and re-enable the element.

13. The non-transitory computer-readable medium of claim 8, wherein the plurality of packet processing components, except for the packet processing component, receive traffic while the recovery procedure is being executed.

14. A method, comprising:

receiving, by a network device, traffic associated with a network, wherein the traffic is received is by a plurality of packet processing components;

storing, by the network device, state information for each of the plurality of packet processing components, while the plurality of packet processing components are receiving the traffic, wherein the state information for a packet processing component, of the plurality of packet processing components, includes:

state configuration information for the packet processing component, and internal storage information for the packet processing component, and wherein the state information is stored using a data structure that is external to the packet processing component;

detecting, by the network device, an error that prevents the packet processing component from processing at least a portion of the traffic; and executing, by the network device and based on detecting the error that prevents the packet processing component from processing at least the portion of the traffic, a recovery procedure that uses the state information to reset the packet processing component to an operational state, wherein executing the recovery procedure comprises:

disabling the packet processing component, obtaining, from the data structure, the state configuration information and the internal storage information, restoring configuration instructions for the packet processing component using the state configuration information, restoring register values for a set of internal registers using the internal storage information, and re-enabling the packet processing component.

15. The method of claim 14, wherein the data structure stores the state information for a limited time period and is internal to the network device.

16. The method of claim 14, wherein the plurality of packet processing components, except for the packet processing component, receive traffic while the recovery procedure is being executed.

17. The method of claim 14, wherein storing the state information comprises:

analyzing the packet processing component using a scanning technique to identify the state information, wherein the scanning technique identifies the state information by scanning a set of internal memories and a set of internal registers, and storing the state information using the data structure.

18. The method of claim 14, wherein the data structure is a first data structure, and wherein storing the state information comprises:

executing a scanning technique to identify the state configuration information and the internal storage information from the packet processing component, executing the scanning technique to identify packet tracking information for the packet processing component from a second data structure that is external to the packet processing component, and storing the state information using the first data structure, wherein the state information includes the packet tracking information.

19. The method of claim 14, wherein executing the recovery procedure further comprises:

disabling an element, of a set of elements associated with the packet processing component, or functionality associated with the element, obtaining state information for the element from the data structure, using the state information for the element to reset the element to a state that the element was in before the error occurred, and re-enabling the element.

20. The method of claim 14, wherein executing the recovery procedure further comprises:

restoring memory values for a set of internal memories using the internal storage information.

\* \* \* \* \*